(12) United States Patent
Fujisaki et al.

(10) Patent No.: US 11,005,120 B2
(45) Date of Patent: May 11, 2021

(54) ELECTROCHEMICAL CELL

(71) Applicant: NGK INSULATORS, LTD., Nagoya (JP)

(72) Inventors: Shinji Fujisaki, Kuwana (JP); Takashi Ryu, Nagoya (JP); Makoto Ohmori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 78 days.

(21) Appl. No.: 16/183,237

(22) Filed: Nov. 7, 2018

(65) Prior Publication Data

US 2019/0088968 A1    Mar. 21, 2019

Related U.S. Application Data

(63) Continuation of application No. PCT/JP2017/027274, filed on Jul. 27, 2017.

(30) Foreign Application Priority Data

Jul. 27, 2016 (JP) .............................. JP2016-147863

(51) Int. Cl.
| | | |
|---|---|---|
| *H01M 8/10* | (2016.01) | |
| *H01M 8/1213* | (2016.01) | |
| *H01M 4/86* | (2006.01) | |
| *H01M 4/90* | (2006.01) | |
| *H01M 8/124* | (2016.01) | |

(52) U.S. Cl.
CPC ....... *H01M 8/1213* (2013.01); *H01M 4/8636* (2013.01); *H01M 4/8642* (2013.01); *H01M 4/9033* (2013.01); *H01M 4/8652* (2013.01); *H01M 2008/1293* (2013.01); *H01M 2300/0077* (2013.01)

(58) Field of Classification Search
CPC ............. H01M 8/1213; H01M 4/8642; H01M 4/8636; H01M 4/9033; H01M 2300/0077; H01M 2008/1293; H01M 4/8652
See application file for complete search history.

(56) References Cited

U.S. PATENT DOCUMENTS

2009/0280376 A1   11/2009   Chiba et al.
2015/0255820 A1   9/2015   Shimomura et al.

FOREIGN PATENT DOCUMENTS

| JP | 09-050814 A | 2/1997 |
| JP | 09-241076 A | 9/1997 |

(Continued)

OTHER PUBLICATIONS

Machine translation of JP 2015-088284, retrieved from www.espacenet.com, on Mar. 6, 2020.*

(Continued)

*Primary Examiner* — Cynthia K Walls
(74) *Attorney, Agent, or Firm* — Flynn Thiel, P.C.

(57) ABSTRACT

The electrochemical cell includes an anode, a cathode active layer, and a solid electrolyte layer disposed between the anode and the cathode active layer. The cathode active layer includes a first region which is disposed facing the solid electrolyte layer, and a second region which is disposed on the first region. An average particle diameter of first constituent particles which constitute the first region is smaller than an average particle diameter of second constituent particles which constitute the second region.

3 Claims, 2 Drawing Sheets

(56) References Cited

FOREIGN PATENT DOCUMENTS

| JP | 2004-055194 A | 2/2004 |
|---|---|---|
| JP | 2004-265739 A | 9/2004 |
| JP | 2006-032132 A | 2/2006 |
| JP | 2011-150813 A | 8/2011 |
| JP | 2014-067692 A | 4/2014 |
| JP | 2015-088284 A | 5/2015 |
| WO | WO 2007/061043 A1 | 5/2007 |
| WO | WO 2014/050148 A1 | 4/2014 |

OTHER PUBLICATIONS

Japanese language International Search Report and Written Opinion for corresponding PCT/JP2017/027274 (10 pgs).
English language International Search Report for corresponding PCT/JP2017/027274 (2 pgs).
English International Written Opinion for corresponding PCT/JP2017/027274 (10 pages).

* cited by examiner

ELECTROCHEMICAL CELL

CROSS-REFERENCE TO RELATED APPLICATIONS

This is a continuation of PCT/JP2017/027274, filed Jul. 27, 2017, which claims priority to Japanese Application No. 2016-147863 filed Jul. 27, 2016, the entire contents of which are hereby incorporated by reference.

TECHNICAL FIELD

The present invention relates to an electrochemical cell.

BACKGROUND ART

In recent years, fuel cells that are a type of electrochemical cell have attracted attention in light of environmental problems and their effective use as an energy source.

A fuel cell generally includes an anode, a cathode active layer, and a solid electrolyte layer disposed between the anode and the cathode active layer.

The cathode active layer, for example, is configured with a perovskite oxide such as $(La,Sr)(Co,Fe)O_3$:(lanthanum strontium cobalt ferrite) or the like (for example, reference is made to Japanese Patent Application Laid-Open No. 2006-32132).

SUMMARY OF INVENTION

There is a need to improve the reactivity of the cathode active layer during power generation in order to enhance fuel cell output.

The present invention has the object of providing an electrochemical cell that is configured to enhance reactivity of the cathode active layer.

The electrochemical cell according to the present invention includes an anode, a cathode active layer, and a solid electrolyte layer disposed between the anode and the cathode active layer. The cathode active layer includes a first region which is disposed facing the solid electrolyte layer, and a second region which is disposed on the first region. An average particle diameter of first constituent particles which constitute the first region is smaller than an average particle diameter of second constituent particles which constitute the second region.

The present invention provides an electrochemical cell that is configured to enhance reactivity of the cathode active layer.

DESCRIPTION OF EMBODIMENTS

Configuration of Fuel Cell 10

Figure 1:
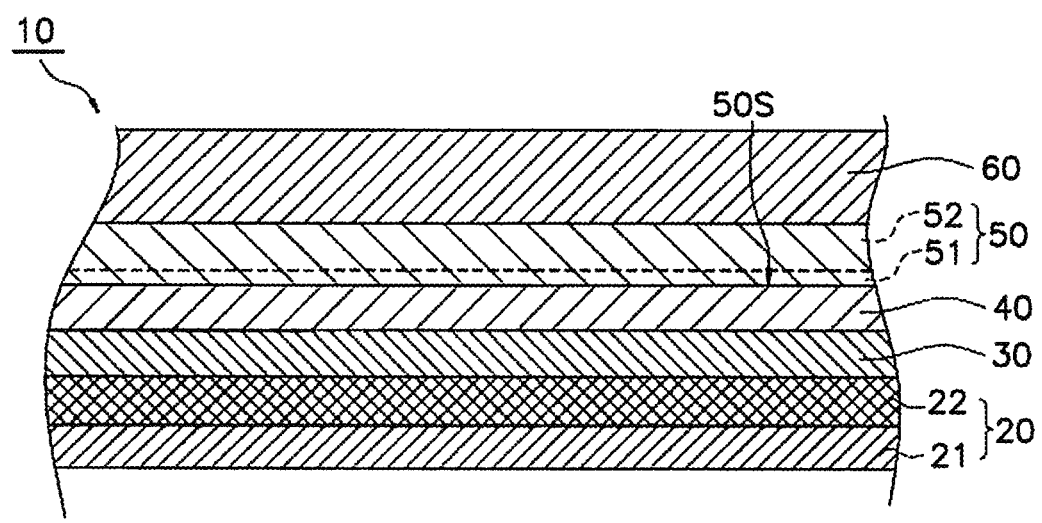
FIG. 1 is a cross sectional view illustrating a configuration of a fuel cell.

The configuration of the fuel cell 10 will be described making reference to the drawings. The fuel cell 10 is configured as a so-called solid oxide fuel cell (SOFC). The possible configurations of the fuel cell 10 include a flat-tubular type, a segmented-in-series type, an anode-supported type, a flat-plate electrolyte type, a tubular type, or the like.

The fuel cell 10 includes an anode 20, a solid electrolyte layer 30, a barrier layer 40, a cathode active layer 50 and a cathode current collecting layer 60.

The anode 20 functions as an anode for the fuel cell 10. As illustrated in FIG. 1, the anode 20 includes an anode current collecting layer 21 and an anode active layer 22.

The anode current collecting layer 21 is configured as a porous body that exhibits superior gas permeability. The material that constitutes the anode current collecting layer 21 includes use of a material that is used in the anode current collecting layer of a conventional SOFC, and for example, includes NiO (nickel oxide)-8YSZ (8 mol % of yttria-stabilized zirconia), or NiO—$Y_2O_3$ (yttria). However, when NiO is included in the anode current collecting layer 21, at least a portion of the NiO may be reduced to Ni during operation of the fuel cell 10. The thickness of the anode current collecting layer 21 may be configured, for example, as 0.1 mm to 5.0 mm.

The anode active layer 22 is disposed on the anode current collecting layer 21. The anode active layer 22 is configured as a porous body that is denser than the anode current collecting layer 21. The material that configures the anode active layer 22 includes use of a material used in an anode active layer of a conventional SOFC, and for example, includes NiO-8YSZ. However, when NiO is included in the anode active layer 22, at least a portion of the NiO may be reduced to Ni during operation of the fuel cell 10. The thickness of the anode active layer 22 may be configured, for example, as 5.0 µm to 30 µm.

The solid electrolyte layer 30 is disposed between the anode 20 and the cathode active layer 50. The solid electrolyte layer 30 in the present embodiment is sandwiched between the anode 20 and the barrier layer 40. The solid electrolyte layer 30 functions to enable permeation of oxide ions that are produced by the cathode active layer 50. The solid electrolyte layer 30 is configured with a material that is denser than the anode 20 or the cathode active layer 50.

The solid electrolyte layer 30 may contain $ZrO_2$ (zirconia) as a main component. In addition to zirconia, the solid electrolyte layer 30 may contain an additive such as $Y_2O_3$ (yttria) and/or $Sc_2O_3$ (scandium oxide). These additives function as a stabilizing agent. The mole composition ratio (stabilizing agent:zirconia) of the stabilizing agent to zirconia in the solid electrolyte layer 30 may be configured to approximately 3:97-20:80. Therefore, the material used in the solid electrolyte layer 30 includes 3YSZ, 8YSZ, 10YSZ, or ScSZ (zirconia stabilized with scandia), or the like. The thickness of the solid electrolyte layer 30, for example, may be configured as 3 µm to 30 µm.

In the present embodiment, the term composition X "contains as a main component" composition Y means that composition Y preferably occupies at least 70 wt % of the total of composition X, and more preferably occupies at least 90 wt %.

The barrier layer 40 is disposed between the solid electrolyte layer 30 and the cathode active layer 50. The barrier layer 40 inhibits formation of a high resistivity layer between the solid electrolyte layer 30 and the cathode active layer 50. The barrier layer 40 is configured with a material that is denser than the anode 20 or the cathode active layer 50. The barrier layer 40 may contain a main component of a ceria-based material such as GDC (gadolinium-doped ceria), SDC (samarium-doped ceria), or the like. The thickness of the barrier layer 40 may be configured, for example, as 3 µm to 20 µm.

The cathode active layer 50 is disposed on the barrier layer 40. The cathode active layer 50 functions as a cathode for the fuel cell 10. The cathode active layer 50 is configured as a porous body. There is no particular limitation on thickness of the cathode active layer 50 and it may be configured as 2 μm to 100 μm The cathode active layer 50 contains a main component that is configured with a perovskite oxide which is expressed by the general formula $ABO_3$ and includes at least one of Sr and La at the A site. The perovskite oxide, for example, may suitably employ a composite perovskite oxide that contains lanthanum, or SSC (samarium strontium cobaltite (Sm, Sr)$CoO_3$) or the like that does not contain lanthanum. However, there is no limitation in this regard. The lanthanum-containing composite perovskite oxide includes LSCF (lanthanum strontium cobalt ferrite): (La, Sr) (Co, Fe)$O_3$), LSF: (lanthanum strontium ferrite: (La, Sr)$FeO_3$), LSC: (lanthanum strontium cobaltite: (La, Sr)$CoO_3$), and LNF (lanthanum nickel ferrite: (La (Ni, Fe)$O_3$), or the like. The density of the main phase that is configured with a perovskite oxide may be configured as 5.5 g/cm$^3$ to 8.5 g/cm$^3$.

The cathode current collecting layer 60 is disposed on the cathode active layer 50. The cathode current collecting layer 60 is configured as a porous body. The porosity of the cathode current collecting layer 60 may be configured to 20% to 50%. There is no particular limitation on thickness of the cathode current collecting layer 60 and it may be configured as 10 μm to 500 μm.

The cathode current collecting layer 60 contains a main component of a material that contains a main component of a perovskite oxide which is expressed by the general formula $ABO_3$ and includes at least one of Sr and La at the A site.

The material that contains a main component of a perovskite complex oxide including at least one of Sr and La at the A site and that is expressed by the general formula $ABO_3$ includes, for example, (La, Sr) Coos or La(Ni, Fe, Cu)$O_3$, or the like. A perovskite complex oxide as expressed by Formula (1) below is particularly suitable.

$$La(Ni_{1-x-y}Fe_xCu_y)O_{3-\delta} \quad (1)$$

It is noted that in composition formula (1), x is greater than or equal to 0.03 and less than or equal to 0.3, y is greater than or equal to 0.05 and less than or equal to 0.5, and δ is greater than or equal to 0 and less than or equal to 0.8. However, it is noted that the arrangement of $N_{1-x-y}Fe_xCu_y$ at the B site is not affected by the x value and y value.

Configuration of Cathode Active Layer 50

The cathode active layer 50 includes a first region 51 and a second region 52 as shown in FIG. 1.

The first region 51 is a region that faces the solid electrolyte layer of the cathode active layer 50. Although there is no limitation in relation to the thickness of the first region 51, it may be configured as greater than or equal to 0.2 μm and less than or equal to 3 μm.

In the present embodiment, since the fuel cell 10 includes a barrier layer 40, the first region 51 makes contact with the barrier layer 40 on the solid electrolyte layer-side surface 50S. The solid electrolyte layer-side surface 50S is the interface between the barrier layer 40 and the cathode active layer 50. However, when the fuel cell 10 does not include a barrier layer 40, the first region 51 will then make contact with the solid electrolyte layer 30 on the solid electrolyte layer-side surface 50S.

When component densities in a cross section of the fuel cell 10 are mapped, the solid electrolyte layer-side surface 50S can be defined with reference to a straight line that is approximated using a method of least squares to a line of a rapid change in the element densities included in the cathode active layer.

The second region 52 is a region that is disposed on the first region 51 of the cathode active layer 50. The second region 52 is disposed on an opposite side of the solid electrolyte layer 30 to thereby sandwich the first region 51. Although there is no limitation in relation to the thickness of the second region 52, it may be configured as greater than or equal to 2 μm and less than or equal to 100 μm. The thickness of the second region 52 may be greater than the thickness of the first region 51.

The first region 51 and the second region 52 contain the perovskite oxide described above as a main component. The perovskite oxide that composes the main component of the first region 51 may be different from the perovskite oxide that composes the main component of the second region 52, but is preferably the same.

Figure 2:
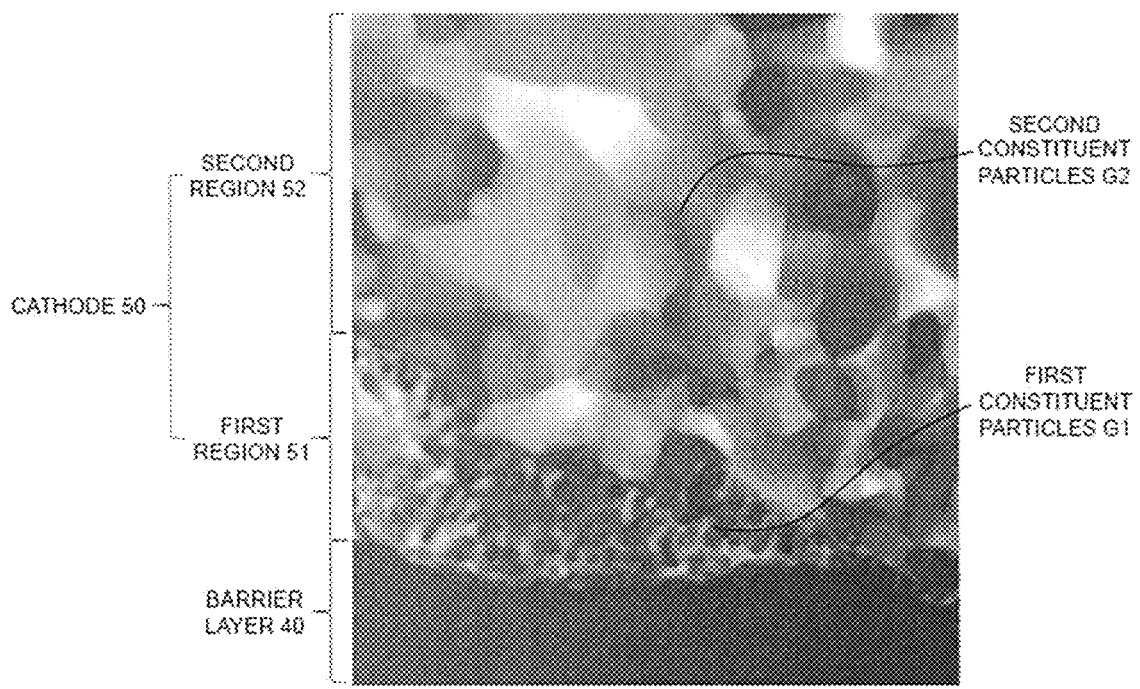
FIG. 2 is a STEM image illustrating a cross section of a cathode active layer.

In this context, FIG. 2 is a scanning transmission electron microscope (STEM) image illustrating a cross section of the cathode active layer 50. The STEM image illustrated in FIG. 2 is an image obtained using a JEM-ARM200F manufactured by JEOL Ltd. that is set to an acceleration voltage of 200 kV in bright-field mode. The first region 51 and the second region 52 illustrated in FIG. 2 respectively contain a main component of LSCF.

The average particle diameter of first constituent particles G1 that constitute the first region 51 is smaller than an average particle diameter of second constituent particles G2 that constitute the second region 52. In this manner, an increase in the absorption and reaction field of oxygen gas caused by the increase in the total area of the first constituent particles G1 is enabled as a result of the fine-grain configuration for the first constituent particles G1 that constitute the first region 51 on the solid electrolyte layer side that tends to affect the reactivity of the cathode active layer 50. Consequently, it is possible to enhance the initial output of the fuel cell 10.

The ratio of the average particle diameter of the first constituent particles G1 to the average particle diameter of the second constituent particles G2 is preferably less than or equal to 0.41. In this manner, it is possible to inhibit the voltage drop rate (deterioration rate) after starting power generation in the fuel cell.

The average particle diameter of the first constituent particles G1 is the value of the arithmetic average of the diameter of a circle that has the same surface area as 50 respective first constituent particles G1 that are randomly selected in the cross section (STEM image) of the first region 51. In the same manner, the average particle diameter of the second constituent particles G2 is the value of the arithmetic average of the diameter of a circle that has the same surface area as 50 respective second constituent particles G2 that are randomly selected in the cross section (STEM image) of the second region 52.

Although there is no particular limitation on the average particle diameter of the first constituent particles G1, it may be configured as greater than or equal to 0.05 μm and less than or equal to 0.5 μm. The average particle diameter of the first constituent particles G1 is preferably less than or equal to 0.2 μm. In this manner, it is possible to inhibit the voltage drop rate (deterioration rate) of the fuel cell 10 after long term operation. Although there is no particular limitation on the average particle diameter of the second constituent particles G2, it may be configured as greater than or equal to 0.4 μm and less than or equal to 1.0 μm. The average particle diameter of the second constituent particles G2 is preferably less than or equal to 0.5 µm. The average particle diameter of the second constituent particles G2 may be configured as less than or equal to 20 times the average particle diameter of the first constituent particles G1, and is preferable less than or equal to 10 times.

Although there is no particular limitation on the cross sectional shape of the first constituent particles G1, it may be configured as circular, elliptical, oblong, or another complex shape, but generally has a circular shape. Although there is no particular limitation on the cross sectional shape of the second constituent particles G2, it may be configured as circular, elliptical, oblong, or another complex shape, but generally has a complex shape.

Although there is no particular limitation on the porosity of the first region 51, it may be configured as greater than or equal to 20% and less than or equal to 40%, and it is preferably greater than or equal to 30%. Although there is no particular limitation on the porosity of the second region 52, it may be configured as greater than or equal to 30% and less than or equal to 40%. The porosity of the first region 51 is a value that is obtained dividing the total area of regions other than the first constituent particles G1 in the cross section (STEM) of the first region 51 by the gross area of the first region 51 in the observation range. The porosity of the second region 52 is a value that is obtained dividing the total area of regions other than the second constituent particles G2 in the cross section (STEM) of the second region 52 by the gross area of the second region 52 in the observation range.

Sr Concentration in First Region 51 and Second Region 52

The respective Sr concentrations in the first region 51 and the second region 52 when the cathode active layer 50 includes Sr will be described below.

(1) First Region 51

The first region 51 has a main component of a perovskite complex oxide expressed by the general formula $(Ln_{1-x}Sr_x)BO_{3-\delta}$.

In the general formula above, Ln denotes the element that occupies the "A site" in the perovskite crystal structure together with Sr (strontium). Ln is at least one type of lanthanide element of the 15 types of lanthanide elements from atomic number 57 La (lanthanum) to atomic number 71 Lu (lutetium). Ln may include only one type of the 15 types of lanthanide elements, or may include a combination of two or more types. Ln preferably includes lanthanide elements that have a comparative large ionic radius such as La (lanthanum), Sm (samarium), Ce (cerium) and Pr (praseodymium). In particular, a configuration in which La and/or Sm is included in Ln is preferred by reason of superior stability in the perovskite crystal structure.

In the general formula above, the subscript x denotes the ratio of Sr that is substituted in the Ln that occupies the A site. The subscript x may take a value of greater than or equal to 0.1 and less than or equal to 0.6. As described below, the subscript x relevant to the first region 51 is preferably smaller than the subscript y relevant to the second region 52. In this manner, since the Sr concentration in the first region 51 is less than the Sr concentration in the second region 52, the coefficient of thermal expansion in the first region 51 can be configured to be smaller than the coefficient of thermal expansion in the second region 52. Therefore, since the difference between the coefficient of thermal expansion in the first region 51 and the coefficient of thermal expansion of the solid electrolyte layer 30 or the barrier layer 40 can be reduced, it is possible to reduce stress that is produced in the interface (that is to say, the solid electrolyte layer-side surface 50S) between the first region 51 and the barrier layer 40 during firing or during operation. As a result, peeling of the cathode active layer 50 can be inhibited.

Although the Sr concentration in the first region 51 may be configured as greater than or equal to 5 atm % and less than or equal to 10 atm %, there is no limitation in this regard. The Sr concentration in the first region 51 is preferably less than or equal to 0.9 times the Sr concentration in the second region 52 as described below. The Sr concentration in the first region 51 is calculated with reference to an element analysis by use of energy dispersive X-ray spectroscopy (EDX) using a scanning transmission electron microscope (STEM) in relation to a cross section of the first region 51.

In the general formula above, "B" denotes the element that occupies the "B site" in the perovskite crystal structure. "B" is at least one type of element selected from Co (cobalt), Ni (nickel), Fe (iron), Mn (manganese) and Cu (copper). A configuration in which "B" is included in the perovskite oxide enables an enhancement in the reactivity and oxide ion conductivity in the first region 51.

In the general formula above, the subscript δ is determined to thereby satisfy a charge neutral condition in the perovskite oxide that is the main component of the first region 51. That is to say, an oxygen defect amount in a perovskite oxide that is expressed by the general formula $ABO_3$ is denoted by the subscript δ. Although the subscript δ is generally is a positive number that does not exceed 1 ($0 \leq \delta < 1$), variation is possible with reference to the types of atoms that substitute a portion of the perovskite oxide, the substitution rate, and environmental conditions, or the like.

The perovskite oxide that is expressed by the general formula above typically includes a perovskite complex oxide that includes lanthanum and a perovskite complex oxide that does not include lanthanum. LSCF, LSF, LSC and LNF or the like are perovskite complex oxides that include lanthanum. SSC or the like is a perovskite complex oxide that does not include lanthanum.

(2) Second Region 52

The second region 52 includes a main component of a perovskite oxide that is expressed by the general formula $(Ln_{1-y}Sr_y)BO_{3-\epsilon}$.

In the general formula above, Ln denotes the element that occupies the "A site" in the perovskite crystal structure together with Sr (strontium). Ln is at least one type of lanthanide element of the 15 types of lanthanide elements from atomic number 57 La (lanthanum) to atomic number 71 Lu (lutetium). Ln may include only one type of the 15 types of lanthanide elements, or may include a combination of two or more types. Ln preferably includes lanthanide elements that have a comparative large ionic radius such as La (lanthanum), Sm (samarium), Ce (cerium) and Pr (praseodymium). In particular, a configuration in which La and/or Sm is included in Ln is preferred by reason of superior stability in the perovskite crystal structure.

In the general formula above, the subscript y denotes the ratio of Sr that is substituted with the Ln that occupies the A site. The subscript y may take a value of greater than or equal to 0.2 and less than or equal to 0.7. The subscript y relevant to the second region 52 is preferably greater than the subscript x relevant to the first region 51. In this manner, the Sr concentration in the second region 52 is greater than the Sr concentration in the first region 51. Therefore, a configuration in which the oxygen ion conductivity in the second region 52 is greater than the first region 51 maintains the overall reactivity of the cathode active layer 50.

Although the Sr concentration in the second region 52 may be configured as greater than or equal to 8 atm % and less than or equal to 13 atm %, there is no limitation in this regard. The Sr concentration in the second region 52 is preferably greater than or equal to 1.1 times the Sr concentration in the first region 51 as described below. The Sr concentration in the second region 52 may be calculated with reference to an element analysis by use of EDX using STEM in relation to a cross section of the second region 52.

In the general formula above, "B" denotes the element that occupies the "B site" in the perovskite crystal structure. "B" is at least one type of element selected from Co (cobalt), Ni (nickel), Fe (iron), Mn (manganese) and Cu (copper). A configuration in which "B" is included in the perovskite oxide enhances the reactivity and oxide ion conductivity in the second region 52.

In the general formula above, the subscript ε is determined to thereby satisfy a charge neutral condition in the perovskite oxide that is the main component of the second region 52. That is to say, an oxygen defect amount in a perovskite oxide that is expressed by the general formula $ABO_3$ is denoted by the subscript ε. Although the subscript ε is generally is a positive number that does not exceed 1 ($0 \leq \varepsilon < 1$), variation is possible with reference to the types of atoms that substitute a portion of the perovskite oxide, the substitution rate, and environmental conditions, or the like.

The perovskite oxide that is expressed by the general formula above typically includes LSCF, LSF, LSC, LNF and SSC in the same manner as the first region 51.

The perovskite oxide that constitutes the main component of the second region 52 may be of a different type to the perovskite oxide that constitutes the main component of the first region 51, but is preferably the same type.

Method of Manufacturing Fuel Cell 10

Next, an example will be described of a manufacture method for the fuel cell 10. In the following description, the term "green body" denotes a member prior to firing.

Firstly, a slurry for the anode current collecting layer is prepared by adding a binder (for example, polyvinyl alcohol) to a mixture of an anode current collecting layer powder (for example, an NiO powder and a YSZ powder) and a pore forming agent (for example, PMMA (polymethylmethacrylate resin)). Next, an anode current collecting layer powder is obtained by drying and granulating the the slurry for the anode current collecting layer in a spray drier. Then, a green body for the anode current collecting layer 21 is formed by molding the anode powder using a die press molding method. At that time, a tape lamination method may be used as a substitute for the die press molding method.

Next, a slurry for the anode active layer is prepared by adding a binder (for example, polyvinyl alcohol) to a mixture of an anode active layer powder (for example, an NiO powder and a YSZ powder) and a pore forming agent (for example, PMMA). Then, a green body for the anode active layer 22 is formed by printing the slurry for the anode active layer onto the green body for the anode current collecting layer 21 using a printing method. In that manner, a green body for the anode 20 is formed. At that time, a tape lamination method or coating method or the like may be used as a substitute for the printing method.

Next, a slurry for the solid electrolyte layer is prepared by mixing a mixture of water and a binder into a solid electrolyte layer powder (for example, a YSZ powder) in a ball mill. Then, a green body for the solid electrolyte layer 30 is formed by coating and drying the slurry for the solid electrolyte layer onto the green body for the anode 20. At that time, a tape lamination method or printing method or the like may be used as a substitute for the coating method.

Next, a slurry for the barrier layer is prepared by mixing a mixture of water and a binder into a barrier layer powder (for example, a GDC powder) in a ball mill. Then, a green body for the barrier layer 40 is formed by coating and drying the slurry for the barrier layer onto the green body for the solid electrolyte layer 30. At that time, a tape lamination method or printing method or the like may be used as a substitute for the coating method.

Next, a laminated body using the green bodies respectively for the anode 20, the solid electrolyte layer 30 and the barrier layer 40 are cofired (1300 to 1600 degrees C. for 2 to 20 hours) to form a cofired body of the anode 20, the solid electrolyte layer 30 and the barrier layer 40.

Then, a first region slurry is prepared by mixing water, a binder, a pore forming agent and the perovskite oxide powder described above in a ball mill. The perovskite oxide powder used in the first region slurry uses a configuration that has an average particle diameter (D50) that is smaller than the perovskite oxide powder used in the second region slurry described below. Although there is no particular limitation in relation to the average particle diameter of the perovskite oxide powder used in the first region slurry, it may be configured as greater than or equal to 0.03 μm to less than or equal to 0.4 μm. Furthermore, the porosity in the first region 51 can be controlled by adjusting the addition amount of the pore forming agent that is used in the first region slurry.

At that time, when a perovskite oxide that is expressed by the general formula $(Ln_{1-x}Sr_x)BO_{3-\varepsilon}$ is used, it is preferred that the subscript x is smaller than the subscript y that is related to the second region slurry described above. In this manner, the Sr concentration in the first region 51 is less than the Sr concentration in the second region 52.

Next, the first region slurry is coated and dried on the barrier layer 40 of the cofired body to form a green body for the first region 51.

Then, a second region slurry is prepared by mixing water, a binder, a pore forming agent and the perovskite oxide powder described above in a ball mill. The perovskite oxide powder used in the second region slurry uses a configuration that has an average particle diameter (D50) that is greater than the perovskite oxide powder used in the first region slurry. Although there is no particular limitation in relation to the average particle diameter of the perovskite oxide powder used in the second region slurry, it may be configured as greater than or equal to 0.3 μm to less than or equal to 0.9 μm. Furthermore, the porosity in the second region 52 can be controlled by adjusting the addition amount of the pore forming agent that is used in the second region slurry.

At that time, when a perovskite oxide that is expressed by the general formula $(Ln_{1-y}Sr_y)BO_{3-\varepsilon}$, is used, it is preferred that the subscript y is greater than the subscript x that is related to the first region slurry described above. In this manner, the Sr concentration in the second region 52 is more than the Sr concentration in the first region 51.

Next, the second region slurry is coated and dried on the green body for the first region 51 to form a green body for the second region 52. In this manner, a green body for the cathode active layer 50 is formed.

Then, a slurry for the cathode current collecting layer is prepared by mixing water and a binder into a cathode current collecting layer powder. Then, a green body for the cathode current collecting layer 60 is formed by coating and drying the slurry for the cathode current collecting layer by use of a coating method or the like onto the green body for the cathode active layer 50.

Then, the green bodies for the cathode active layer 50 and the cathode current collecting layer 60 are fired (1000 to 1100 degrees C. for 1 to 10 hours) in an electrical furnace (oxygen containing atmosphere) to form the cathode active layer 50 and the cathode current collecting layer 60 on the barrier layer 40. At that time, the firing time may be adjusted to enable fine adjustment in the cathode active layer 50 to the average particle diameter of the first constituent particles G1 that configure the first region 51 and the average particle diameter of the first constituent particles G2 that configure the second region 52.

MODIFIED EXAMPLES

Although an embodiment of the present invention has been described above, the present invention is not limited to the above embodiment, and various changes or modifications may be added within a scope that does not depart from the spirit of the invention.

In the present embodiment, although a configuration has been described in which the cathode active layer 50 according to the present invention is applied to the fuel cell 10, in addition to a fuel cell, the cathode active layer of the present invention may be applied to a solid oxide-type electrochemical cell such as a solid oxide-type electrolysis cell.

In the present embodiment, although the fuel cell 10 comprises the anode 20, the solid electrolyte layer 30, the barrier layer 40, the cathode active layer 50 and the cathode current collecting layer 60, there is no limitation in this regard. The fuel cell 10 may comprise the anode 20, the solid electrolyte layer 30, and the cathode active layer 50, or another layer may be interposed between the anode 20 and the solid electrolyte layer 30, or between the solid electrolyte layer 30 and the cathode active layer 50.

Example 1

Although Example 1 of a cell according to the present invention will be described below, the present invention is not limited to the following examples.

Preparation of Samples No. 1 to No. 22

A fuel cell according to Samples No. 1 to No. 22 was prepared as described below.

First, an anode current collecting layer (NiO:8YSZ 50:50 (Ni volume % conversion)) was formed with a thickness of 500 μm using a die press molding method, and on that layer, an anode active layer (NiO:8YSZ=45:55 (Ni volume % conversion)) was formed using a printing method with a thickness of 20 μm.

Then a green body for a GDC layer and an 8YSZ layer were sequentially formed on the anode active layer using a coating method and co-fired (1400 degrees C., 2 hours).

Next, a first region slurry was prepared by mixing water, a binder, a pore forming agent and the perovskite oxide powder described in Table 1 in a ball mill. At that time, the average particle diameter (D50) of the perovskite oxide powder was varied in each sample.

Then, the first region slurry was coated and dried onto the barrier layer of the co-fired body to form a green body for the first region of the cathode active layer.

Then, a second region slurry was prepared by mixing water, a binder, a pore forming agent and the perovskite oxide powder described in Table 1 in a ball mill. At that time, the average particle diameter (D50) of the perovskite oxide powder was varied in each sample.

The second region slurry was coated and dried onto the green body for the first region to form a green body for the second region.

Next, water and a binder were mixed with an La(Ni, Fe, Cu)$O_3$ powder to prepare a cathode current collecting layer slurry. Then, a green body for the cathode current collecting layer was formed by coating the slurry for the cathode current collecting layer by use of a coating method or the like onto the green body for the cathode active layer.

Next, a cathode active layer and cathode current collecting layer were formed by firing the green bodies for the cathode active layer (first region and second region) and the cathode current collecting layer for one hour in an electrical furnace (oxygen containing atmosphere, 1000 degrees C.).

Observation of First Region and Second Region

First, after polishing a cross section of the cathode active layer in each sample with precision machinery, flake processing was performed using an FB-2100 manufactured by Hitachi High-Technologies Corporation.

Next, a STEM image of a cross section of the first region and the second region of the cathode active layer enlarged with a magnification of 100,000 times was obtained by use of STEM. The STEM image was obtained using STEM (JEM-ARM200F manufactured by JEOL Inc.) set to an acceleration voltage of 200 kV and in bright-field mode.

Then, the STEM image was used to calculate the average particle diameter of the first constituent particles in the first region and the average particle diameter of the second constituent particles in the second region. An average equivalent circle diameter of 50 first constituent particles that were randomly selected on the STEM image was calculated as the average particle diameter of the first constituent particles. An average equivalent circle diameter of 50 second constituent particles that were randomly selected on the STEM image was calculated as the average particle diameter of the second constituent particles. The average particle diameter of the first constituent particles and the second constituent particles are shown in Table 1.

Measurement of Fuel Cell Output

While supplying nitrogen gas to the anode side and air to the cathode active layer side of each sample, the temperature was increased to 750 degrees C. When reaching a temperature of 750 degrees C., hydrogen gas was supplied for 3 hours to the anode to perform a reduction process.

Next, a rated current density value of 0.2 A/cm$^2$ was set, and power generation for 1000 hours was performed, while measuring the cell voltage. An initial output after 10 hours from commencement of power generation and a voltage drop ratio after 1000 hours (deterioration rate) were calculated. In Table 1, the initial output of each sample is a value such that the initial output of Sample Nos. 14, 17 and 19 that are provided with first constituent particles and the second constituent particles of the same average particle diameter is normalized to 1.0. In Table 1, a sample that has a deterioration rate of less than or equal to 0.15% is evaluated as "⊚," a sample that has a deterioration rate that exceeds 0.15% and is less than or equal to 0.2% is evaluated as "o," and a sample that has a deterioration rate that is greater than 0.2% a is evaluated as "Δ."

TABLE 1

| | Cathode | | | | Average Particle | | |
|---|---|---|---|---|---|---|---|
| | First Region | | Second Region | | Diameter of First | | |
| | | Average Particle Diameter of First Constituent | | Average Particle Diameter of Second Constituent | Constituent Particles/ Average Particle | | |
| Sample | Main Component | Particles (μm) | Main Component | Particles (μm) | Diameter of Second Constituent Particles | Relative Ratio of Initial Output | Deterioration Rate |
| No. 1 | LSCF | 0.05 | LSCF | 0.50 | 0.10 | 1.02 | ◎ |
| No. 2 | LSCF | 0.11 | LSCF | 0.55 | 0.20 | 1.02 | ◎ |
| No. 3 | LSCF | 0.25 | LSCF | 0.65 | 0.38 | 1.02 | ◎ |
| No. 4 | LSCF | 0.45 | LSCF | 1.13 | 0.40 | 1.01 | ○ |
| No. 5 | LSCF | 0.82 | LSCF | 1.10 | 0.75 | 1.01 | Δ |
| No. 6 | LSCF | 1.05 | LSCF | 1.20 | 0.88 | 1.01 | Δ |
| No. 7 | LSC | 0.10 | LSC | 0.50 | 0.20 | 1.02 | ◎ |
| No. 8 | LSC | 0.47 | LSC | 1.15 | 0.41 | 1.01 | ○ |
| No. 9 | LSC | 1.10 | LSC | 1.25 | 0.88 | 1.01 | Δ |
| No. 10 | LSC | 1.20 | LSC | 1.52 | 0.79 | 1.01 | Δ |
| No. 11 | SSC | 0.15 | SSC | 0.40 | 0.38 | 1.02 | ◎ |
| No. 12 | SSC | 0.41 | SSC | 1.23 | 0.33 | 1.01 | ○ |
| No. 13 | SSC | 1.05 | SSC | 1.20 | 0.88 | 1.01 | Δ |
| No. 14 | LSCF | 0.52 | LSCF | 0.52 | 1.00 | 1.00 | — |
| No. 15 | LSCF | 0.50 | LSCF | 0.30 | 1.67 | 0.99 | — |
| No. 16 | LSCF | 0.65 | LSCF | 0.40 | 1.63 | 0.98 | — |
| No. 17 | LSC | 0.43 | LSC | 0.43 | 1.00 | 1.00 | — |
| No. 18 | LSC | 0.55 | LSC | 0.40 | 1.38 | 0.99 | — |
| No. 19 | SSC | 0.40 | SSC | 0.40 | 1.00 | 1.00 | — |
| No. 20 | SSC | 0.77 | SSC | 0.50 | 1.54 | 0.98 | — |
| No. 21 | LSF | 0.20 | LSF | 0.60 | 0.33 | 1.02 | ◎ |
| No. 22 | LNF | 0.15 | LNF | 0.50 | 0.30 | 1.02 | ◎ |

As shown in Table 1, Sample Nos. 1 to 13, 21 and 22 configure the cathode active layer as a double layer structure with a first region and second region and are such that the average particle diameter of the first constituent particles is smaller than the average particle diameter of the second constituent particles. When compared with Sample Nos. 14 to 20, those samples exhibit an improvement in the initial output of the fuel cell. This feature is due to the fact that a finer grain configuration in the first constituent particles enables an improvement in the reactivity of the first region on the solid electrolyte layer side that tends to influence the reactivity of the cathode active layer.

Furthermore, as shown in Table 1, the deterioration rate of the fuel cell was inhibited in Sample Nos. 1 to 4, 7, 8, 11, 12, 21, and 22 in which the ratio of the average particle diameter of the first constituent particles to the average particle diameter of the second constituent particles was less than or equal to 0.41.

Furthermore, as shown in Table 1, the deterioration rate of the fuel cell was inhibited in Sample Nos. 1 to 4, 7, 8, 11, 12, 21, and 22 in which the average particle diameter of the first constituent particles was less than or equal to 0.47 μm. This feature is due to the fact that an increase in the total area of the first constituent particles enables a reduction in the ratio of the region of surface reaction inactivation due to impurities in the first region. In addition, it can be seen that the deterioration rate of the fuel cell was inhibited by a configuration in which the average particle diameter of the first constituent particles was less than or equal to 0.25 μm.

Furthermore, as shown in Table 1, the deterioration rate of the fuel cell was further inhibited in Sample Nos. 1 to 3, 7, 11, 21, and 22 in which the average particle diameter of the second constituent particles was less than or equal to 0.65 μm. This feature is due to the fact that optimizing the particle diameter of the second constituent particles maintains a suitable porosity in the second region and thereby improves oxygen gas diffusibility in the second region.

Example 2

Preparation of Samples No. 23 to No. 37

A fuel cell according to Samples No. 23 to No. 37 was prepared as described below.

First, an anode current collecting layer (NiO:BYSZ 50:50 (Ni volume % conversion)) was formed with a thickness of 500 μm using a die press molding method, and on that layer, an anode active layer (NiO:8YSZ=45:55 (Ni volume % conversion)) was formed using a printing method with a thickness of 20 μm.

Then, a green body for a GDC layer and an 8YSZ layer were sequentially formed on the anode active layer using a coating method and co-fired (1400 degrees C., 2 hours).

Next, a first region slurry was prepared by mixing water, a binder, a pore forming agent and the perovskite oxide powder described in Table 2 in a ball mill. At that time, the average particle diameter (D50) of the perovskite oxide powder was varied for each sample. The adjustment of the subscript x in the general formula $(Ln_{1-x}Sr_x)BO_{3-\delta}$ for the perovskite oxide powder enabled a variation of the Sr concentration in the first region of each sample as shown in Table 2.

Then, the first region slurry was coated and dried onto the barrier layer of the co-fired body to form a green body for the first region of the cathode active layer.

Then, a second region slurry was prepared by mixing water, a binder, a pore forming agent and the perovskite oxide powder described in Table 2 in a ball mill. At that time, the average particle diameter (D50) of the perovskite oxide powder was varied for each sample. The adjustment of the subscript y in the general formula $(Ln_{1-y}Sr_y)BO_{3-\epsilon}$ for the perovskite oxide powder enabled a variation of the Sr concentration in the second region of each sample as shown in Table 2. Sample Nos. 23 to 37 configured the cathode active layer as a double layer structure with a first region and second region and the average particle diameter of the first constituent particles was smaller than the average particle diameter of the second constituent particles.

The second region slurry was coated and dried onto the green body for the first region to form a green body for the second region.

Next, water and a binder were mixed with an La(Ni, Fe, Cu)O$_3$ powder to prepare a cathode current collecting layer slurry. Then, a green body for the cathode current collecting layer was formed by coating the slurry for the cathode current collecting layer by use of a coating method or the like onto the green body for the cathode active layer.

Next, a cathode active layer and cathode current collecting layer were formed by firing the green bodies for the cathode active layer (first region and second region) and the cathode current collecting layer for one hour in an electrical furnace (oxygen containing atmosphere, 1000 degrees C.).

Sr Concentration in Cathode Active Layer

Firstly, after polishing a cross section of the cathode active layer in each sample with precision machinery, flake processing was performed using an FB-2100 manufactured by Hitachi High-Technologies Corporation.

Then, a STEM image of a cross section of the first region and the second region of the cathode active layer enlarged with a magnification of 10,000 times was obtained by use of JEM-ARM200F manufactured by JEOL Inc., and an element analysis was performed by EDX to measure the Sr concentration in the first region and the second region. The measurement results are shown in Table 2.

Observation of Peeling in Cathode Active Layer

The interface of the cathode active layer (first region) and the barrier layer in each sample was observed to observe peeling in the interface between the first region and the barrier layer. Table 2 shows that a sample in which peeling was not observed is denoted as "no" and a sample in which peeling of greater than 5 μm that is considered to have an effect on the characteristics of the fuel cell is denoted as "yes."

Measurement of Fuel Cell Output

While supplying nitrogen gas to the anode side and air to the cathode active layer side of each sample, the temperature was increased to 750 degrees C. When reaching a temperature of 750 degrees C., hydrogen gas was supplied for 3 hours to the anode to perform a reduction process.

Next, a rated current density value was set to 0.2 A/cm$^2$, and an initial output after 10 hours from commencement of power generation was calculated, while measuring cell voltage. In Table 2, the initial output of each sample is a value such that the initial output of Sample Nos. 14, 17 and 19 as shown in Table 1 (samples in which the average particle diameter of the first constituent particles and the second constituent particles is configured to be the same) is normalized to 1.0.

TABLE 2

| | | First Region | | | Second Region | | | | |
|---|---|---|---|---|---|---|---|---|---|
| Example | Main Component | Average Particle Diameter of First Constituent Particles (μm) | Sr Concentration (atm %) | Main Component | Average Particle Diameter of Second Constituent Particles (μm) | Sr Concentration (atm %) | Sr Concentration of First Region/ Sr Concentration of Second Region | Relative Ratio of Initial Output | Peeling of Cathode |
| No. 23 | LSCF | 0.15 | 3.1 | LSCF | 0.40 | 5.3 | 0.61 | 1.01 | No |
| No. 24 | LSCF | 0.25 | 11.9 | LSCF | 0.65 | 12.8 | 0.93 | 1.01 | No |
| No. 25 | LSF | 0.10 | 4.3 | LSF | 0.30 | 6.4 | 0.67 | 1.01 | No |
| No. 26 | LSF | 0.20 | 11.5 | LSF | 0.51 | 11.9 | 0.97 | 1.02 | No |
| No. 27 | SSC | 0.15 | 12.4 | SSC | 0.45 | 12.8 | 0.97 | 1.01 | No |
| No. 28 | LSCF | 0.11 | 5.1 | LSCF | 0.35 | 8.5 | 0.60 | 1.03 | No |
| No. 29 | LSCF | 0.13 | 8.4 | LSCF | 0.33 | 12.9 | 0.65 | 1.04 | No |
| No. 30 | LSCF | 0.20 | 9.9 | LSCF | 0.50 | 11.2 | 0.88 | 1.04 | No |
| No. 31 | LSF | 0.15 | 5.3 | LSF | 0.43 | 10.1 | 0.52 | 1.03 | No |
| No. 32 | LSF | 0.22 | 9.6 | LSF | 0.55 | 11.1 | 0.86 | 1.04 | No |
| No. 33 | SSC | 0.20 | 6.2 | SSC | 0.51 | 9.6 | 0.65 | 1.03 | No |
| No. 34 | LSCF | 0.10 | 5.2 | LSCF | 0.33 | 3.0 | 1.73 | 1.01 | Yes |
| No. 35 | LSCF | 0.23 | 9.8 | LSCF | 0.56 | 5.6 | 1.75 | 1.02 | Yes |
| No. 36 | LSF | 0.17 | 5.0 | LSF | 0.43 | 3.6 | 1.39 | 1.02 | Yes |
| No. 37 | SSC | 0.23 | 4.8 | SSC | 0.57 | 3.1 | 1.55 | 1.01 | Yes |

As shown in Table 2, Sample Nos. 23 to 37 configure the cathode active layer as a double layer structure with a first region and second region and the average particle diameter of the first constituent particles is smaller than the average particle diameter of the second constituent particles. Therefore, in the same manner as the results in Table 1, when compared with Sample Nos. 14 to 20, the initial output of the fuel cell can be improved.

Furthermore, in Sample Nos. 23 to 33 in which the Sr concentration in the first region is lower than the Sr concentration in the second region, peeling in the first region was inhibited in comparison to Sample Nos. 34 to 37.

There was a further improvement in initial output of the fuel cell in Sample Nos. 28 to 33 in which the Sr concentration in the first region was greater than or equal to 5 atm % and less than or equal to 10 atm %. This feature is due to the fact that optimization of the Sr concentration in the first region to a composition range that exhibits high oxygen ion conductivity enables a further improvement to the reactivity in the first region on the solid electrolyte layer side that tends to influence the electrode reactions in the cathode active layer.

What is claimed is:

1. An electrochemical cell comprising:
   an anode,
   a cathode active layer comprising a main component that is configured with a perovskite oxide which is expressed by the general formula ABO$_3$ and includes at least Sr at the A site, and a solid electrolyte layer disposed between the anode and the cathode active layer, the cathode active layer including a first region which is disposed facing the solid electrolyte layer, and a second region which is disposed on the first region, wherein an Sr concentration in the first region is lower than an Sr concentration in the second region, and an average particle diameter of first constituent particles which constitute the first region being smaller than an average particle diameter of second constituent particles which constitute the second region.

2. The electrochemical cell according to claim 1, wherein the Sr concentration in the first region is greater than or equal to 5 atm % and less than or equal to 10 atm %.

3. The electrochemical cell according to claim 1, wherein the Sr concentration in the second region is greater than or equal to 8 atm % and less than or equal to 13 atm %.

* * * * *